Sept. 23, 1952     E. W. ASHTON     2,611,198
POULTRY TAG

Filed Jan. 31, 1949                          2 SHEETS—SHEET 1

Inventor
E. W. Ashton
By
Glascock Downing Reebold
Attorneys

Sept. 23, 1952      E. W. ASHTON      2,611,198
POULTRY TAG

Filed Jan. 31, 1949      2 SHEETS—SHEET 2

Inventor
E. W. Ashton
By
Glascock Downing Seebold
Attorneys

Patented Sept. 23, 1952

2,611,198

UNITED STATES PATENT OFFICE 2,611,198

POULTRY TAG

Ernest Ward Ashton, Ottawa, Ontario, Canada, assignor, by mesne assignments, to Stoffel Seals Corporation, Tuckahoe, N. Y., a corporation of New York Application January 31, 1949, Serial No. 73,837

10 Claims. (Cl. 40—3)

The present invention relates to poultry-tags, particularly poultry-tags that may be attached to the breast of a graded bird.

Tremendous numbers of poultry-tags are manufactured in Canada and the United States of America. The marking of graded chickens and turkeys and to a lesser extent, ducks and geese is the chief use to which poultry-tags are put and while tags must meet Government specifications a manufacturer must also consider the requirements of the distributer and the consumer. In the past wing-tags have been popular and quite satisfactory for certain purposes. They were variously constructed but usually were so made that they could be conveniently and securely clipped to the wing of a bird but were unsuitable for clipping to the breast. Recently however there has been a demand for a breast tag, that is to say, a tag that may be secured to the breast of a fowl carcass rather than to the wing. Wing tags are not satisfactory for that purpose for the reason that when secured to the breast they stand more or less erect whereas a satisfactory breast-tag should lie flat on the breast. Attempts to modify existing wing-tags failed to produce a satisfactory breast-tag but following a good deal of work and experimentation applicant has succeeded in making a breast-tag that is entirely suitable for all purposes and may be used with any type of bird. It is vastly superior to the wing-tag in that it does not pierce or otherwise damage the skin or flesh and when attached to a carcass it lies flat against the skin and is therefore satisfactory for display purposes and does not in any way constitute an encumbrance.

Figure 1:
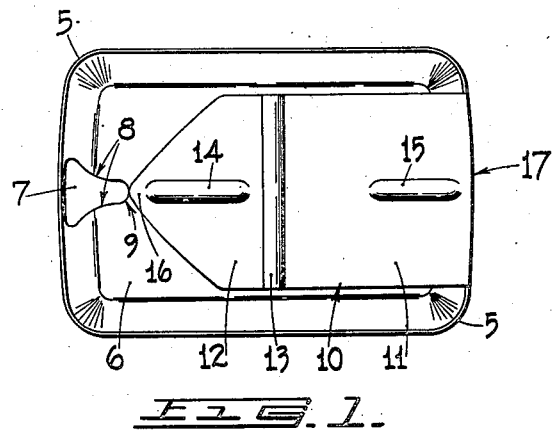
Figure 2:
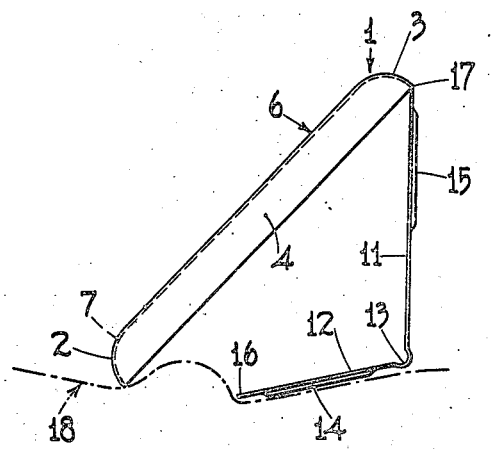
Figure 3:
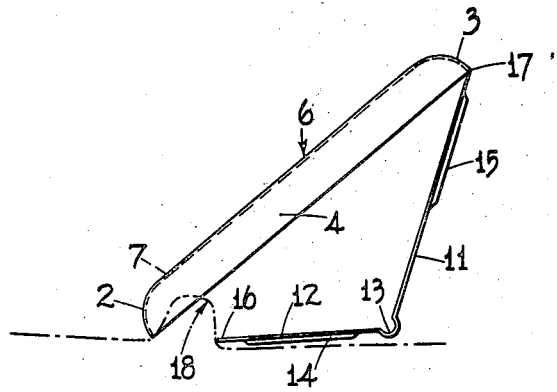
Figure 4:
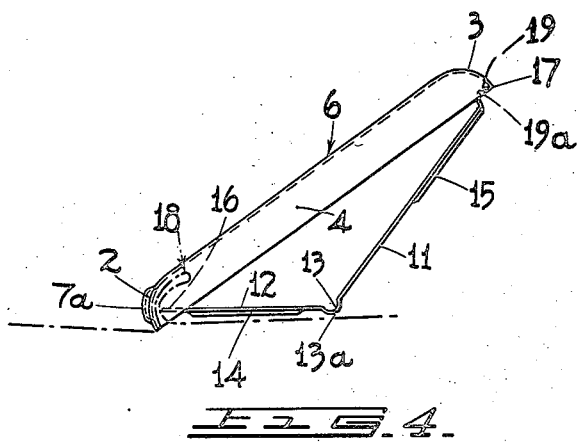
Figure 5:
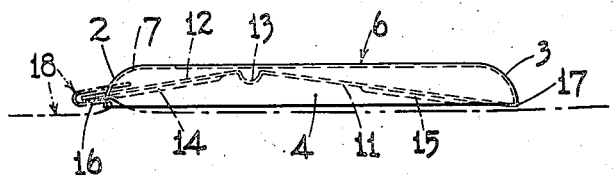

The invention consists in the construction, combination and arrangement of parts to be hereinafter described and more particularly pointed out in the appended claims. One embodiment of the invention will be described by way of example with reference to the accompanying drawings in which:

Figure 1 is an inverted plan view of the underside of a tag made in accordance with the invention;

Figures 2, 3, and 4 are side views showing the tag in progressive stages of being secured to the skin;

Figure 5 is also a side view and shows the tag closed and fixed in position.

The tag comprises an approximately rectangular, dished main portion 1 having curved end-walls 2 and 3; curved side walls 4; preferably rounded corners 5 and a flattened top portion 6, these parts forming a unitary structure. An aperture 7 is formed in the end-wall 2 and extends into the top portion 6. The aperture 7 is preferably roughly triangular in shape and as shown, has convex sides 8 and a rounded apex 9. Integral with the end-wall 3 and extending therefrom in the direction of end-wall 2 and aperture 7 is a locking tongue 10 of normally angular formation forming a toggle, one arm 11 of which normally diverges from the upper portion 1 and the other arm 12 diverges from the part 11 when the tag is in the open position. The tongue 10 may be formed at the junction of parts 11 and 12 with a crease or fold-line 13 which may be semi-circular in cross section and extends from side to side of the tongue 10. The crease 13 thus reinforces or stiffens the tongue laterally. The parts 11 and 12 of the tongue 10 may be stiffened longitudinally by means of ridges or reinforcing means 14 and 15 as shown. The free end of the part 12 of the tongue 10 is tapered to a blunt point 16 and the tongue 10 itself is free to pivot or bend at the point indicated by numeral 17, it being at that point that the tongue 10 joins the main or body portion 1, the top surface of which bears the desired certification mark. The tag can be conveniently made of sheet tin or coated steel about $12/1000$ of an inch in thickness.

In order to secure one of the tags to the breast of a fowl it is merely necessary to bring the tag into contact with the skin as shown in Figure 2 and to squeeze the tag between the thumb and forefinger. The edge of the end-wall 2 rests on the skin of the fowl and a small section of skin indicated at 18 is engaged by the point 16 and forced toward the aperture 7. As the pressure of the thumb and forefinger is continued the toggle-shaped tongue 10 is gradually straightened as the angle between the parts or sections 11 and 12 approaches 180°. Meanwhile the point 16 forces the fold of skin 18 into contact with the convex sides 8 of the aperture 7 and the point 16 together with the skin is forced forwardly along the sides 8 and finally through the aperture 7. Continued pressure at this stage forces the locking tongue 10 to snap into the reverse angular position shown in Figure 5. In that position the tag is "locked" to the skin of the fowl carcass and may not be removed without damage to or destruction of the tag.

It is not essential that the aperture be an open hole as shown at 7. This aperture may if desired be formed by stamping a recess in the wall 2 as indicated at 7a in Figure 4. The term "aperture" as used in the claims is intended to include a recess of this nature, and is, in fact, intended to be interpreted broadly as meaning a "tongue-engageable formation."

A further modification also shown in Figure 4 is a second crease or fold-line 19 which, like the fold-line 13 may be semi-circular in cross-section and may be situated at the point of juncture between the tongue 10 and the main portion 1. The fold line 13 and also the fold-line 19 may if desired be provided with lesser crease-lines 13a and 19a also shown in Figure 4. The crease-lines 13a and 19a tend to weaken the tongue 10 to the extent that it will be damaged if one of the "locked" tags is tampered with or removed from a fowl carcass.

It will be understood that the invention is not limited to the shape of the parts shown in the drawings. The essential features are merely a body portion of any convenient shape bearing the certification mark and provided at one end with an aperture and at the other end with an angularly bent tongue so arranged and dimensioned that it can be readily manipulated to cause a fold of skin to be thrust through the aperture, the tongue being meanwhile straightened.

The ridges 13, 14, and 15 are not essential features.

The invention thus provides a seal or tag of extreme simplicity and effectiveness.

The embodiments of the invention in which an exclusive property or privilege is claimed are defined as follows:

1. A breast tag for marking poultry which is closable from an open position and comprises a dish-shaped main portion and a locking-tongue, said tongue extending normally at an angle with respect to said dish-shaped portion and being integral therewith, said tongue comprising two sections joined by means of a bendable corrugation; said two sections of said tongue extending in normal angular relation to each other to thereby form a toggle, one of said sections of said tongue extending away from said dish-shaped portion, the other of said sections terminating in a blunt point extending towards said dish-shaped portion in the direction of an approximately triangular aperture located centrally of said dish-shaped portion at one end thereof; the part of said tongue other than said point, when the tag is in closed sealing position being wholly continued within said dish-shaped portion and being locked therein in an angular position which is reversed with respect to said normal angular position, said blunt point extending a short distance into said aperture.

2. A breast tag for marking poultry comprising a dished main portion having an aperture, a locking tongue mounted on said main portion for movement relative thereto and into locking position in engagement with said aperture of said main portion, said locking tongue including two sections, and bendable means joining said two sections together for movement relative to each other to form a toggle and normally maintaining said two sections in a first angular position with respect to each other exteriorly of and extending away from said main portion, said locking tongue, upon the application of pressure thereto directed toward said main portion, being movable to enter into said locking position with said two sections in a second angular position with respect to each other but reversed with respect to said first angular position and substantially interiorly of said dished main portion.

3. A tag according to claim 2, including spaced reinforcing means on said locking tongue arranged along the length of the latter.

4. A breast tag for marking poultry comprising a dished main portion provided with a recess defining an aperture adjacent one end thereof, and a locking tongue having one end connected to the other end of said main portion and mounted for movement relative to said main portion and into a locking position wherein the other end of said locking tongue is received within said aperture, said locking tongue including two sections, and bendable means joining said two sections together for movement relative to each other and normally maintaining said two sections in a first angular position with respect to each other exteriorly of and extending away from said main portion, said locking tongue, upon the application of pressure thereto directed toward said main portion, being movable to enter into said locking position with said two sections in a second angular position with respect to each other substantially interiorly of said main portion.

5. A tag according to claim 4, wherein said second angular position is substantially the reverse of said first angular position.

6. A tag structure comprising a main portion having an aperture, a locking tongue having a tip, said tongue extending normally at an angle with respect to said main portion and being integral therewith, said tongue comprising two sections joined to each other by a bendable knee, whereby said two sections form a toggle, which when moved against said main portion flattens out and lengthens to thereby bring about engagement of said tip of said tongue with said aperture.

7. A tag structure according to claim 6, wherein said tip of said tongue forms a blunt point, whereby foldable material may be gripped between said blunt point and said aperture without piercing said material.

8. A tag structure according to claim 6, wherein said tongue is provided with reinforcing means positioned remote from said knee.

9. A tag structure according to claim 8, wherein said reinforcing means extend on each of said sections and are separated from each other by said knee.

10. A tag structure for marking food products and like articles comprising a main portion, a flap portion including a hinge connecting said main portion to said flap portion, a tongue forming an extension of said flap portion and joined angularly thereto to provide with said flap portion a toggle, said main portion being provided with means for receiving the forward and free end of said tongue, and reinforcing means extending on said flap portion, said flap portion and said tongue being together of greater length than said main portion.

ERNEST WARD ASHTON.

REFERENCES CITED

The following references are of record in the file of this patent:

UNITED STATES PATENTS

| Number | Name | Date |
|---|---|---|
| 1,192,792 | Lenk | July 25, 1916 |
| 1,249,515 | Schaub | Dec. 11, 1917 |
| 1,510,083 | Berntson | Sept. 30, 1924 |
| 1,902,531 | Timson | Mar. 21, 1933 |
| 1,934,341 | Brooks | Nov. 7, 1933 |
| 1,957,023 | Hutnikow | May 1, 1934 |
| 1,961,806 | Weiss | June 5, 1934 |
| 1,984,880 | Ker et al. | Dec. 18, 1934 |
| 2,590,883 | Nierhaus | Apr. 1, 1952 |

FOREIGN PATENTS

| Number | Country | Date |
|---|---|---|
| 676,066 | Germany | May 25, 1939 |